(12) United States Patent
Murata

(10) Patent No.: US 8,472,782 B2
(45) Date of Patent: Jun. 25, 2013

(54) INFORMATION PROCESSING APPARATUS AND INFORMATION PROCESSING METHOD

(75) Inventor: Atsuhiro Murata, Kirishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 439 days.

(21) Appl. No.: 12/297,887

(22) PCT Filed: Jun. 26, 2007

(86) PCT No.: PCT/JP2007/063195
§ 371 (c)(1),
(2), (4) Date: Oct. 21, 2008

(87) PCT Pub. No.: WO2008/004507
PCT Pub. Date: Jan. 10, 2008

(65) Prior Publication Data
US 2009/0185786 A1    Jul. 23, 2009

(30) Foreign Application Priority Data
Jul. 7, 2006    (JP) .................................. 2006-188693

(51) Int. Cl.
*H04N 5/932* (2006.01)
(52) U.S. Cl.
USPC .......................................... 386/219; 386/248
(58) Field of Classification Search
None
See application file for complete search history.

(56) References Cited

U.S. PATENT DOCUMENTS

| | | | |
|---|---|---|---|
| 6,377,744 B1 * | 4/2002 | Wakui | 386/230 |
| 6,597,859 B1 * | 7/2003 | Leinhart et al. | 386/248 |
| 2001/0024562 A1 * | 9/2001 | Nomura et al. | 386/52 |
| 2004/0170386 A1 * | 9/2004 | Mikawa | 386/69 |
| 2005/0086356 A1 * | 4/2005 | Shah et al. | 709/231 |

FOREIGN PATENT DOCUMENTS

| | | |
|---|---|---|
| JP | 06-044126 A | 2/1994 |
| JP | 2002-094898 A | 3/2002 |
| JP | 2002-112165 | 4/2002 |
| JP | 2005-012693 A | 2/2005 |
| JP | 2005-051453 | 2/2005 |
| JP | 2005072729 A | 3/2005 |
| JP | 2006-053871 | 2/2006 |
| JP | 2006-157446 | 6/2006 |

OTHER PUBLICATIONS

Aug. 18, 2011 Japanese Office Action, that issued in Japanese Patent Application No. 2006-188693.
Jun. 10, 2011 Japanese Office Action, that issued in Japanese Patent Application No. 2006-188693.

* cited by examiner

*Primary Examiner* — William C Vaughn, Jr.
*Assistant Examiner* — Eileen Adams
(74) *Attorney, Agent, or Firm* — Cowan, Liebowitz & Latman, P.C.

(57) ABSTRACT

An information processing apparatus that correctly handles moving image files recorded for a period straddling midnight. Moving image files recorded for a period straddling midnight are processed as having the day on which recording of those moving image files began and the next day as their recorded date. When conducting a search by date, for example, in addition to the actual recorded day, the next day is also included in the search results of a designated search, thus enabling the user to search for the moving image files without having to recall whether or not they were recorded for a period straddling midnight.

17 Claims, 7 Drawing Sheets

INFORMATION PROCESSING APPARATUS AND INFORMATION PROCESSING METHOD

TECHNICAL FIELD

The present invention relates to an information processing apparatus and information processing method, and more particularly, to an information processing apparatus and information processing method for handling moving image files.

BACKGROUND ART

Recently, moving image recording apparatuses utilizing mass storage media typified by hard disk drives (HDD) have come into widespread use. As recording media have gained mass storage capability, it has become possible to record large numbers of moving image files.

In a recording apparatus of this type, in order to improve user operability it is essential to provide the capability to search for and find quickly and easily a target moving image file from among a large number of moving image files recorded.

For example, it is possible to provide a search function that finds and categorizes image data with the date as search criteria using date of creation information recorded as moving image file management information or moving image file metadata (date search function).

However, for a recording that straddles midnight during recording, it is possible that the date of recording in the mind of the user and the recorded date of creation information are different. In such an instance, when the user carries out a date search, the search results will not be what the user intends. If the results are not what the user intends, it is then necessary to designate the dates before and after the original search date and carry out the search again, which gives the user a poor impression of the apparatus' usability.

Patent Publication No. 1 (Japanese Patent Laid-Open No. 2006-053871) discloses an information processor that, when conducting a search by date of an image photographed using a digital camera or the like, in addition to the designated date also deems the next day up to a predetermined time as the date of the previous day and carries out the search. With Patent Publication No. 1, a series of images photographed straddling midnight such as an event or the like can be correctly obtained as search results using the foregoing search.

However, with Patent Publication No. 1, because up to a preset, predetermined time is deemed to be the previous day, images photographed after that time are not included in the search results, and thus does not provide a basic solution to the problem. In addition, Patent Publication No. 1 basically targets still images, and there is no suggestion whatsoever of handling images that straddle midnight during recording of a single moving image file.

DISCLOSURE OF INVENTION

The present invention is conceived in light of the problems of the conventional art described above, and provides an information processing apparatus and information processing method capable of correctly handling in particular moving image files recorded for a period straddling midnight.

According to an aspect of the present invention, there is provided an information processing apparatus comprising: determination means configured to determine whether or not a moving image file recorded on a recording medium is a moving image file recorded for a period straddling midnight using time information associated with the moving image file; and processing means configured to process the moving image file recorded on the recording medium based on a recorded date of the moving image file, the processing means carrying out the processing by treating the moving image file recorded for a period straddling midnight as having as its recorded date both a day on which recording of the moving image file began and the day after the day on which recording began.

According to another aspect of the present invention, there is provided an information processing apparatus configured to record a moving image file in a storage device, the information processing apparatus comprising: determination means configured to determine whether or not a moving image file recorded in the storage device is a moving image file recorded for a period straddling midnight; and recording means configured to, for a moving image file determined by the determination means to be a moving image file recorded for a period straddling midnight, associate information indicating recording over a period straddling midnight with the moving image file and record therewith.

According to a further aspect of the present invention, there is provided an information processing method comprising: a determination step of determining whether or not a moving image file recorded on a recording medium is a moving image file recorded for a period straddling midnight using time information associated with the moving image file; and a processing step of processing the moving image file recorded on the recording medium based on a recorded date of the moving image file, the processing step carrying out the processing by treating the moving image file recorded for a period straddling midnight as having as its recorded date both a day on which recording of the moving image file began and the day after the day on which recording began.

Further features of the present invention will become apparent from the following description of exemplary embodiments with reference to the attached drawings.

BEST MODE FOR CARRYING OUT THE INVENTION referred embodiments of the present invention will now be described in detail in accordance with the accompanying drawings.

First Embodiment

Figure 1:
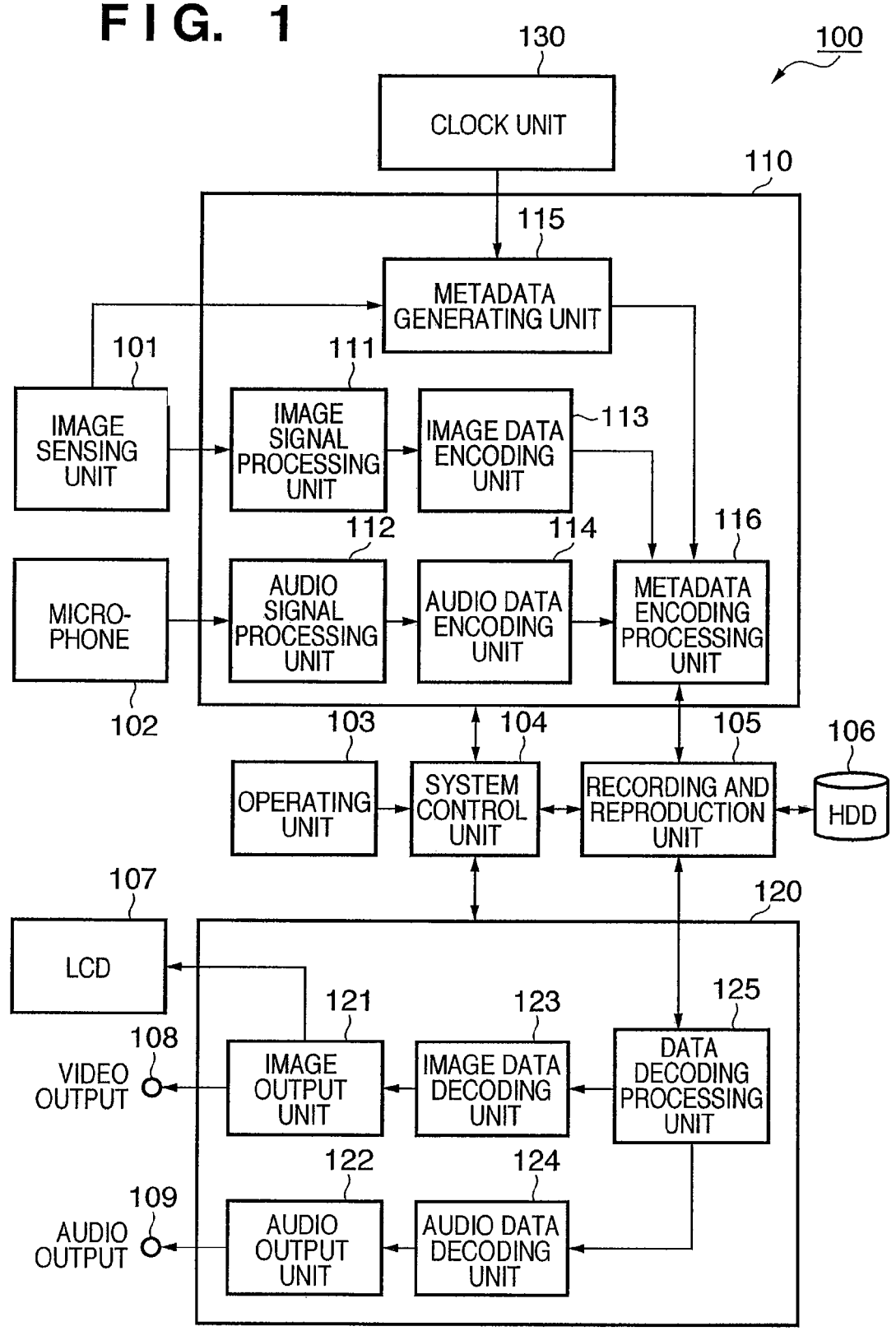
FIG. 1 is a block diagram showing an example of a digital video camera configuration as one embodiment of an information processing apparatus according to one embodiment of the present invention.

FIG. 1 is a block diagram showing an example of a configuration of a digital video camera 100 as one embodiment of an information processing apparatus according to one embodiment of the present invention.

The digital video camera 100 is provided with an image sensing unit 101, a microphone 102, an operating unit 103, a system control unit 104, a recording and reproduction unit 105, a hard disk drive 106, an LCD 107, a record processing block 110 and a reproduction processing block 120.

The record processing block 110 is composed of an image signal processing unit 111, an audio signal processing unit 112, an image data encoding unit 113, an audio data encoding unit 114, a metadata generating unit 115, and a data encoding processing unit 116.

The reproduction processing block 120 is composed of an image output unit 121, an audio output unit 122, an image data decoding unit 123, an audio data decoding unit 124, and a data decoding processing unit 125.

The operating unit 103 is a man-machine interface that the user uses for conveying a variety of settings and instructions to the digital video camera 100. In the present embodiment, the operating unit 103 is provided with a power switch, an operating mode selecting switch, a recording start/pause button, a reproduction start button, a fast forward button, a rewind button, a stop button, and the like.

(Record Mode)

First, a description is given of the operation of the digital video camera 100 in the record mode.

When the recording start button is pressed while the digital video camera 100 is set to the record mode by the operating mode switching selecting switch of the operating unit 103, the system control unit 104 detects the pressing of the recording start button and causes the units of the record processing block 110 to start recording.

The record processing block 110 encodes image data obtained by the image sensing unit 101 and outputs the encoded image data in a predetermined format to the recording and reproduction unit 105. The recording and reproduction unit 105 adds additional information such as headers predetermined for each file format to the data stream output from the record processing block 110 and generates a moving image file that it then records to the hard disk drive (HDD) 106.

In the record processing block 110, the image data input from the image sensing unit 101 is supplied to the image signal processing unit 111. The image signal processing unit 111 performs processing necessary for encoding the image data from the image sensing unit 101 in a preset, predetermined coding format, such as subsampling, and outputs the processed image data to the image data encoding unit 113.

The image data encoding unit 113 encodes the image data from the image signal processing unit 111 in accordance with a preset, predetermined coding format, such as MPEG 2 or Motion JPEG and the like, and outputs the encoded data to the data encoding processing unit 116. In addition, the image data encoding unit 113 generates a thumbnail image as a representative image of a single moving image file and outputs the thumbnail image data to the data encoding processing unit 116.

Audio data from the microphone 102 is input to the audio signal processing unit 112. The audio signal processing unit 112 converts the audio signal from the microphone 102 into digital data. The audio signal processing unit 112 further processes the audio data, carrying out noise reduction, amplification and so forth, and outputs the processed audio data to the audio data encoding unit 114. The audio data encoding unit 114 then encodes the audio data from the audio signal processing unit 112 in accordance with a preset, predetermined coding format, such as MPEG2, and outputs the encoded data to the data encoding processing unit 116.

The metadata generating unit 115 generates metadata showing photographic information such as date of photography, aperture value (F stop) and the like, and outputs the metadata to the data encoding processing unit 116. In addition, the metadata generating unit 115 also sets a date-straddling flag that is described later.

Figure 5:
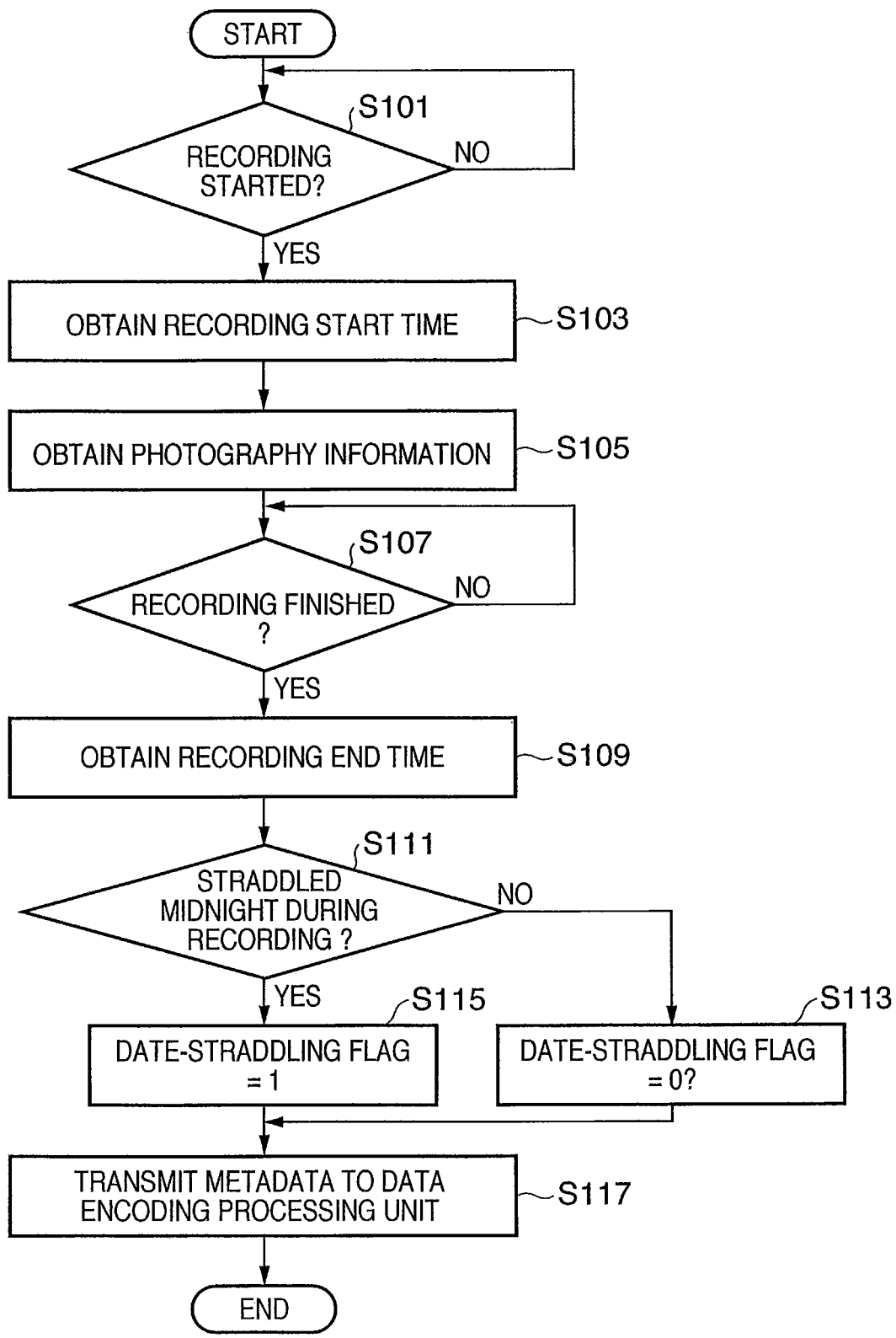
FIG. 5 is a flow chart illustrating a process of generating metadata carried out by a metadata generating unit of the digital video camera according to one embodiment of the present invention.

FIG. 5 is a flow chart illustrating the metadata generating process carried out by the metadata generating unit 115.

Prior to the start of recording, the metadata generating unit 115 stands by to record (S101). Once recording is started, the metadata generating unit 115 obtains the current date and time from a clock unit 130 and stores the date and time as record start time information in an internal memory, not shown (S103). Then, the metadata generating unit 115 acquires photography information such as the aperture value and the like from, for example, the image sensing unit 101, and stores the photography information in the internal memory. Thereafter, the metadata generating unit 115 stands by until recording is finished (S107). During this time, photography information may be obtained as necessary. Once recording is finished, the metadata generating unit 115 obtains the current date and time from the clock unit 130 and stores it as recording end time information in the internal memory (S109).

Next, from the record start time information obtained in S103 and the recording end time information obtained in S109, the metadata generating unit 115 checks whether or not recording straddles midnight, that is, whether or not the date has changed during recording (S111). Then, if the date has changed, the metadata generating unit 115 sets the date-straddling flag to 1 in S115. If the date has not changed, the metadata generating unit 115 sets the date-straddling flag to 0 in S113. Finally, the metadata generating unit 115 outputs the date-straddling flag and the other information stored in the internal memory as recorded moving image metadata to the data encoding processing unit 116 (S117) and ends the metadata generating process. At this time, in place of or in addition to the recording end date and time, the recording period may be saved in the metadata.

The data encoding processing unit 116 converts the encoded image data from the image data encoding unit 113 and the encoded audio data from the audio data encoding unit 114 into an MPEG2 or JPEG transport stream (TS) format. In addition, the data encoding processing unit 116 stores the metadata that the metadata generating unit 115 outputs and the thumbnail image from the image data encoding unit 113 in the header or the footer of the TS data file as image file associated information. The data encoding processing unit 116 outputs the TS converted file to the recording and reproduction unit 105.

The digital video camera 100 of the present embodiment, from input of an instruction to start recording until input of an instruction to stop recording, combines the image data and the audio input from the image sensing unit 101 and the microphone 102 and records them as a single file. The instruction to stop recording is for example input by pressing the stop button. Then, the data encoding processing unit 116 stores the metadata from the metadata generating unit 115 and the thumbnail image from the image data encoding unit 113 in the header or the footer of the files. In addition to these, the file name and the like are also recorded in the header.

(Reproduction Mode)

Next, a description is given of operation of the digital video camera 100 in the reproduction mode.

When the reproduction start button is pressed while the digital video camera 100 is set to the reproduction mode by the operating mode selecting switch of the operating unit 103, the system control unit 104 detects the pressing of the reproduction start button and causes the reproduction processing block 120 to output thumbnail images stored in the header of footer of the moving image files recorded on the hard disk drive 106. The system control unit 104 then displays the output thumbnail images as a list on the liquid crystal display device (LCD) 107 that is one example of a display device.

The user checks the thumbnail images displayed on the LCD 107 and, using for example directional keys include in the operating unit 103, selects the thumbnail image of the file that the user wishes to reproduce, presses the set button, and designates the moving image file to be reproduced. Once the moving image file to be reproduced is designated, the system control unit 104 causes the units of the reproduction processing block 120 to decode the designated moving image file and display the decoded moving image file on the LCD 107.

The reproduction processing block 120 obtains the designated moving image file from the hard disk drive 106 through the recording and reproduction unit 105. Then, the reproduction processing block 120 decodes the image data and the audio date of that moving image file and outputs the data to a video output terminal 108 and an audio output terminal 109, respectively, and also displays the reproduced image on the LCD 107.

More specifically, when the moving image file to be reproduced is designated, the system control unit 104 causes the recording and reproduction unit 105 to output the designated moving image file from the hard disk drive 106 and supply it to the reproduction processing block 120.

The moving image file output from the hard disk drive 106 by the recording and reproduction unit 105 is then output to the data decoding processing unit 125. The data decoding processing unit 125 detects the image data and the audio data from the supplied moving image file, and further, detects data from the moving image file header and footer, after which it outputs the image data to the image data decoding unit 123 and the audio data to the audio data decoding unit 124, respectively.

The image data decoding unit 123 decodes the image data output from the data decoding processing unit 125 and outputs the decoded image data to the image output unit 121. The image output unit 121 converts the decoded image data into a format suitable. for processing by an external monitor or some other external device and outputs the converted image data to at least one of the video output terminal 108 and the LCD 107.

The audio data decoding unit 124 decodes the audio data output from the data decoding processing unit 125 and outputs the decoded audio data to the audio output unit 122. The audio output unit 122 converts the decoded audio data into a format suitable for processing by an external device and outputs the converted audio data to the audio output terminal 109. It should be noted that the audio signal may also be output to a speaker, not shown.

(Date Search Process)

Next, a description is given of a date search process of the digital video camera 100 of the present embodiment.

Figure 2:
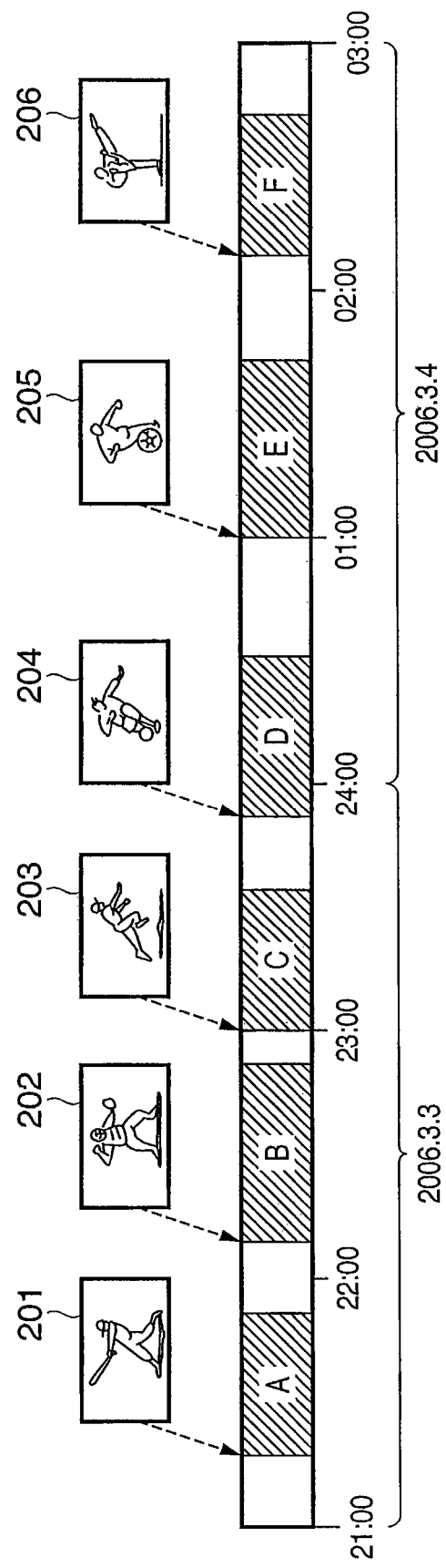
FIG. 2 is a diagram showing schematically in chronological sequence moving image files recorded by the digital video camera according to one embodiment of the present invention.

FIG. 2 is a diagram showing schematically in chronological sequence moving image files recorded by the digital video camera 100 of the present embodiment.

In FIG. 2, of multiple moving image files recorded on the hard disk drive 106, six moving image files A-F photographed on Mar. 3 and 4, 2006 are shown. In FIG. 2, reference numerals 201-206 show schematically the thumbnail images stored in the headers or footers of the moving image files. The date changes during photography of moving image file D, and therefore moving image file D is a moving image file recorded for a period that straddles midnight.

Figure 3:
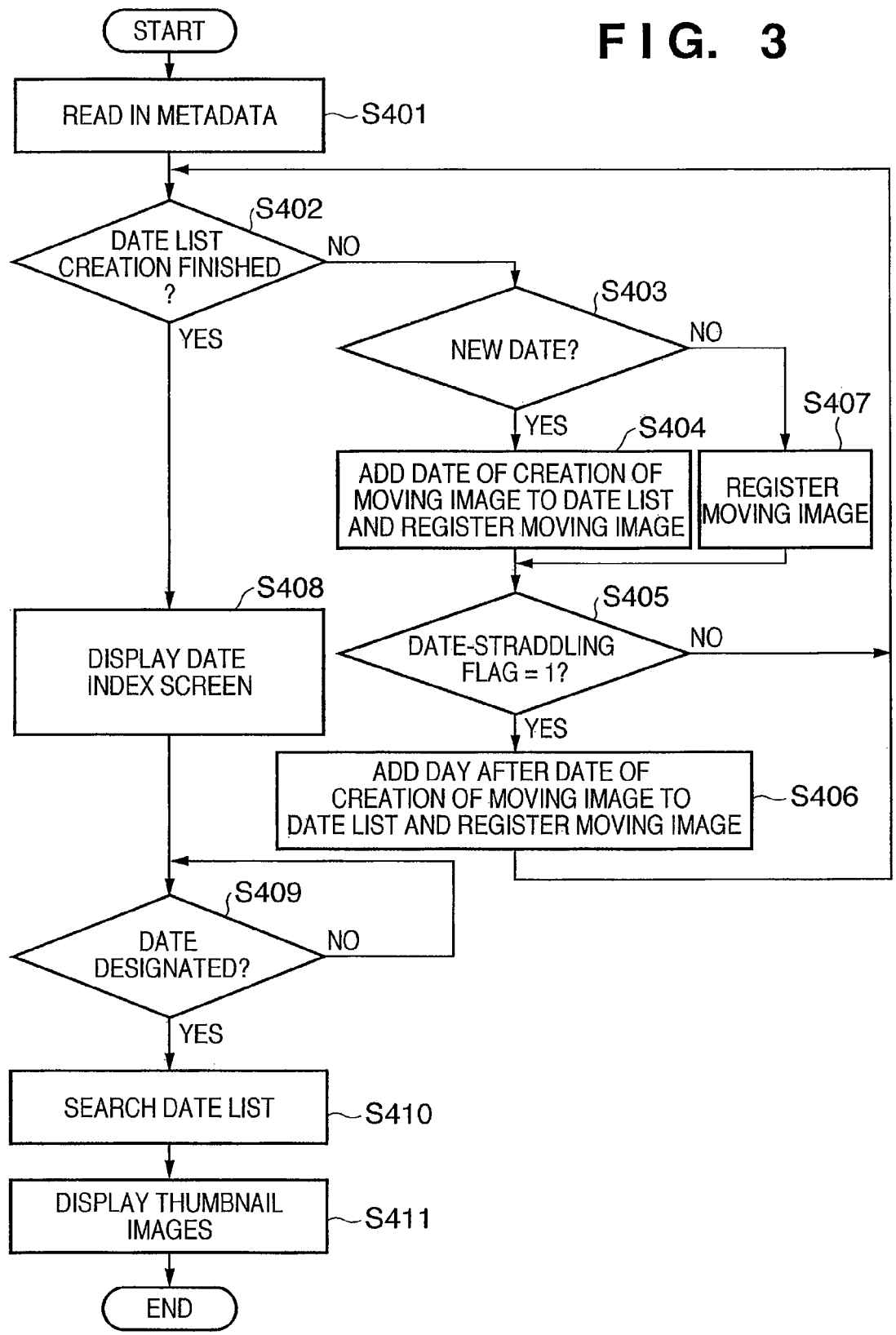
FIG. 3 is a flow chart illustrating a date search operation of the digital video camera according to one embodiment of the present invention.

FIG. 3 is a flow chart illustrating the date search operation of the digital video camera 100 of the present embodiment.

The user selects and sets the date search using, for example, the directional keys and the set button included in the operating unit 103. In response thereto, the system control unit 104 obtains the metadata recorded as associated information in the headers or the footers of the moving image files recorded on the hard disk drive 106 (S401).

Next, the system control unit 104, based on the record start time information of the moving image files include in the metadata thus obtained and on the date-straddling flag, starts a process of creating a date list needed to display a date index screen.

First, it is determined whether or not the system control unit 104 has finished creating the date list, that is, whether or not all the moving image files are reflected in the list (step S402). If it is determined that the system control unit 104 has finished creating the date list, processing proceeds to S408. If it is determined that the system control unit 104 has not yet finished creating the date list, processing proceeds to S403.

In S403, the system control unit 104 determines whether or not the record start time information of the metadata to be processed is a new date that is not included in the date list at that moment. If the date is new, the system control unit 104 adds that date to the date list and registers the moving image file (S404).

The process of registering the moving image file is one of associating information capable of identifying the moving image file that has the processed metadata with a date and storing the date-associated information in, for example, an internal memory of the system control unit 104.

Further, when registering a new date in the date list, the system control unit 104 checks whether or not the date-straddling flag included in the metadata to be processed is set (that is, whether the flag value is 1) (S405). If the date-straddling flag is set, the system control unit 104 associates the day after the recording start day of the moving image file as well as the recording start day (S406) and registers. At this time, if the next day also is a new date it is added to the date list. Then, the system control unit 104 returns the process to S402 and continues processing the unprocessed metadata in sequence.

By contrast, if in S403 the record start time information of the metadata to be processed is not a new date, the system control unit 104 associates a date already on the date list and registers the moving image file that corresponds to the metadata (S407). Then, the system control unit 104 moves the process to S405 and carries out the date-straddling flag check described above. Then, if the date-straddling flag=1, the system control unit 104, if the day after the recording start day of the moving image file is not registered in the date list, adds that next day to the date list and associates the moving image file with that next day after the recording start day as well (S406). If the day after the recording start day is registered in the date list, the system control unit 104 only associates the moving image file with the day after the recording start day and registers, and does not add the date.

Thus, as described above, in this embodiment, for moving image files that do not represent new dates as well the date-straddling flag is checked, thus enabling moving images recorded for a period straddling midnight to be associated with the day after the recording start day and registered without fail even when, for example, the metadata processing sequence does not follow the recorded date and time sequence.

Once the metadata for all the moving image files recorded on the hard disk drive 106 is processed and the date list is completed, the system control unit 104 creates the date index screen and displays the screen on the LCD 107 (S408).

Figure 4:
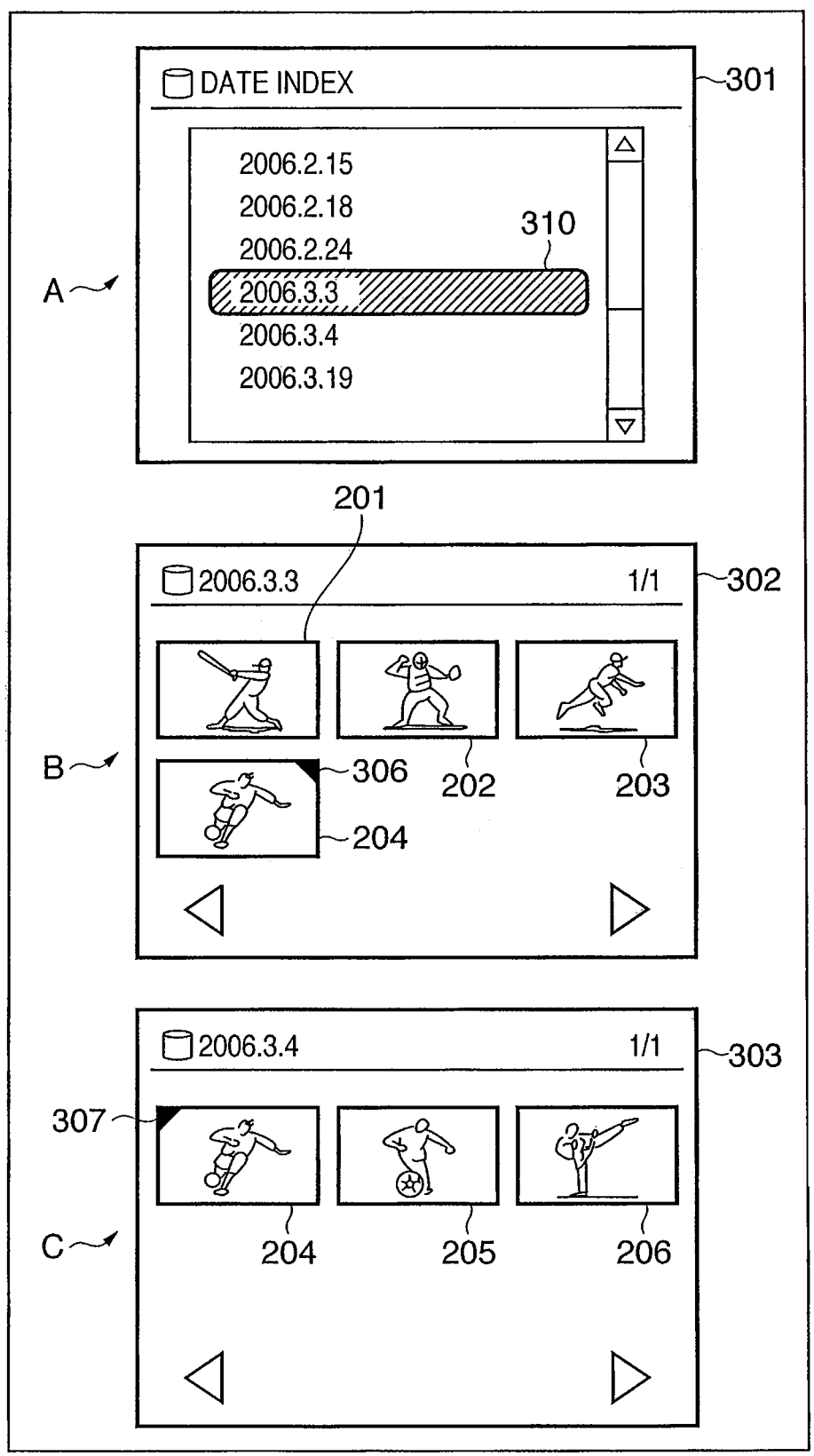
FIG. 4 is a diagram showing examples of date index screens displayed in the digital video camera according to one embodiment of the present invention.

FIG. 4 is a diagram showing examples of date index screens displayed on the LCD 107 in the digital video camera 100 of the present embodiment.

In A, an example of a date index screen 301 is shown.

When the date index screen 301 is displayed, the user can use the up/down directional keys, for example, and move a cursor 310 up and down. The user can then select a date to be designated using the cursor 310 and designate that date by, for example, pressing an execute button or a set button.

In S409, the system control unit 104 waits for a date designation from the user. Once a date is designated, the system control unit 104, using the designated date, checks the date list and obtains thumbnail images of the corresponding moving image files (S410). Then, the system control unit 104 displays on the LCD 107 a screen showing a list of the thumbnail images thus obtained (thumbnail index screen) and ends the process (S411).

B of FIG. 4 shows an example of a thumbnail index screen 302. The thumbnail index screen 302 displays thumbnail images of moving image files included in the record start time information for Mar. 3, 2006 designated in the date index screen 301 shown in A. Based on the sequence shown in FIG. 2, the thumbnail images 201-204 of moving image files A-D are displayed in the date index screen 301.

In the thumbnail index screen 302, in addition to the thumbnail images, a title containing the designated date as well as the page number/total number of pages is also displayed. The thumbnail index screen 302 of the present embodiment is in a display format that contains six thumbnail images per page. If it is necessary to display seven or more images, the seventh and succeeding thumbnail images are displayed in sequence on a second and succeeding page(s).

Here, unlike thumbnail images 201-203 of the moving image files A-C that do not straddle midnight during recording, a continuation mark 306 is applied to the upper right corner of thumbnail image 204 of moving image file D that does straddle midnight during recording.

In other words, the system control unit 104, when creating a thumbnail index screen, checks the value of the date-straddling flag that is obtained together with the thumbnail image and displays a thumbnail image for which the date-straddling flag=1 distinguishably from a thumbnail image for which the date-straddling flag=0.

As for the method used to display the thumbnail image distinguishably, there are methods in which an additional display is performed only for thumbnail images of moving image files recorded for a period straddling midnight. One example of such methods, as shown here in B of FIG. 4, involves marking thumbnail image 204 for which the date-straddling flag=1 by blotting out a portion thereof, so as to be visually distinguishable from the remaining thumbnail images 201-203 for which the date-straddling flag=0. In the example shown in B of FIG. 4, the corner of the thumbnail image is blotted out in the shape of a triangle. However, the location and shape of the blot may be made anything that does not interfere with the ability to recognize the thumbnail image.

In addition, the display of the thumbnail images may be the same, with the thumbnail images of moving image files recorded for a period straddling midnight. displayed surrounded by a frame or displayed with some sort of message nearby. Alternatively, besides such enhanced display, methods involving changing the color or providing a flashing display may be used. In other words, any method of display may be employed provided that such method makes it possible to distinguish visually between thumbnail images of moving image files recorded for a period straddling midnight and thumbnail images of moving image files not recorded for a period straddling midnight.

Further, the present embodiment also changes the display for thumbnail images for which the date-straddling flag=1 according to the relation between the designated date and the recording start day of the moving image files. Specifically, the present embodiment changes the position of the markings of thumbnail images of moving image files that continue to the next day and thumbnail images of moving image files that continue from the previous day.

In other words, in the process of S406, for a moving image file for which the date-straddling flag has been set, such a moving image file is associated with the day after the recording start day and registered. Therefore, a moving image file for which the date-straddling flag has been set is detected not only in a date search using the recording start day as the search criterion but also in a date search that uses the day after the recording start day as the search criterion. In the example shown in FIG. 2, moving image file D, for which recording started on Mar. 3, 2006 and straddled midnight, is associated with both Mar. 3 and Mar. 4, 2006 and registered. Therefore, the thumbnail image 204 of moving image file D is displayed when either Mar. 3, 2006 or Mar. 4, 2006 is designated C of FIG. 4 shows an example of a thumbnail image displayed when Mar. 4, 2006 is designated. In thumbnail index screen 303, thumbnail images 204-206 of moving image files D-F are displayed.

Then, a mark 307 indicating that the moving image file straddles midnight is applied to the thumbnail image 204 of the moving image file D that continues from the previous day. However, the position of the mark is different from that of the thumbnail image 204 (shown in B of FIG. 4) that is displayed when the date March 3 is designated.

In the present embodiment, a mark is added to the right side of the thumbnail image of a moving image file that continues through the next day whereas a mark is added to the left side of the thumbnail image of a moving image file that continues from the previous day. In the thumbnail images, if the line is the same the thumbnail image of a new moving image file is displayed on the right. As a result, applying a mark to the right side of the thumbnail image of the moving image file that continues to the next day further makes it intuitively easy to grasp the fact that there is a continuation. Accordingly, based on the same concept, a mark is applied to the left side of the thumbnail image of the moving image file that continues from the previous day.

By operating the operating unit 103 and selecting and setting the thumbnail image of a moving image file to be reproduced the user can input an instruction to reproduce the moving image file. The system control unit 104 identifies from the date list the moving image file that corresponds to the thumbnail image designated by the user and executes the reproduction process described above.

Thus, as described above, when processing moving image files based on day of recording, the present embodiment handles a moving image file recorded for a period straddling midnight as having a recording date of both the day on which recording of that moving image file began and the next day. In order to do so, when there is a moving image file recorded for a period straddling midnight, the present embodiment associates that moving image file with both the recording start day and the next day. As a result, when conducting a search, both days are searched when either date is designated. Moreover, the moving image file can be found with certainty no matter how late recording ended on the next day.

In addition, when a file recorded for a period straddling midnight is found, the image representing that moving image file is displayed by a different method so as to enable the user to recognize clearly a moving image file recorded for a period straddling midnight.

In addition, it is of course possible to identify whether or not a moving image file is one recorded for a period straddling midnight from the date and time of creation and the recording time, without using a date-straddling flag. In that case, in the metadata generating process shown in FIG. 5, S111 to S115 are unnecessary. In addition, in S405 shown in FIG. 3, instead of checking the value of the date-straddling flag, it may be determined from the recording start date and time and the recording end date and time included in the metadata whether or not the moving image file in question is a moving image file recorded for a period straddling midnight.

In addition, although a digital video camera is shown as an example of an information processing apparatus that can employ the present invention, the present invention can also be adapted to a simple information processing apparatus unequipped with an image sensing unit.

Second Embodiment

A date-straddling flag can also be used not only for a search by date but also for other applications.

For example, the date-straddling flag can be used when copying a moving image file from the digital video camera 100 described in the first embodiment to another apparatus (such as a PC).

When copying a moving image file to another apparatus, usually the moving image files are copied while being categorized into folders for each date. In this case, by using a date list created using the date-straddling flag and determining the copy destination folders for the moving image files, a moving image file recorded for a period straddling midnight can be copied to both the folder corresponding to the recording start day and the folder corresponding to the next day. In addition, other moving image files not recorded for a period straddling midnight can be automatically categorize and copied to the correct folder.

In addition, even without generating a date list, when the date-straddling flag of a moving image file to be copied is checked and the flag is found to be set, the moving image file is copied to folders corresponding to the dates straddling midnight.

Figure 7:
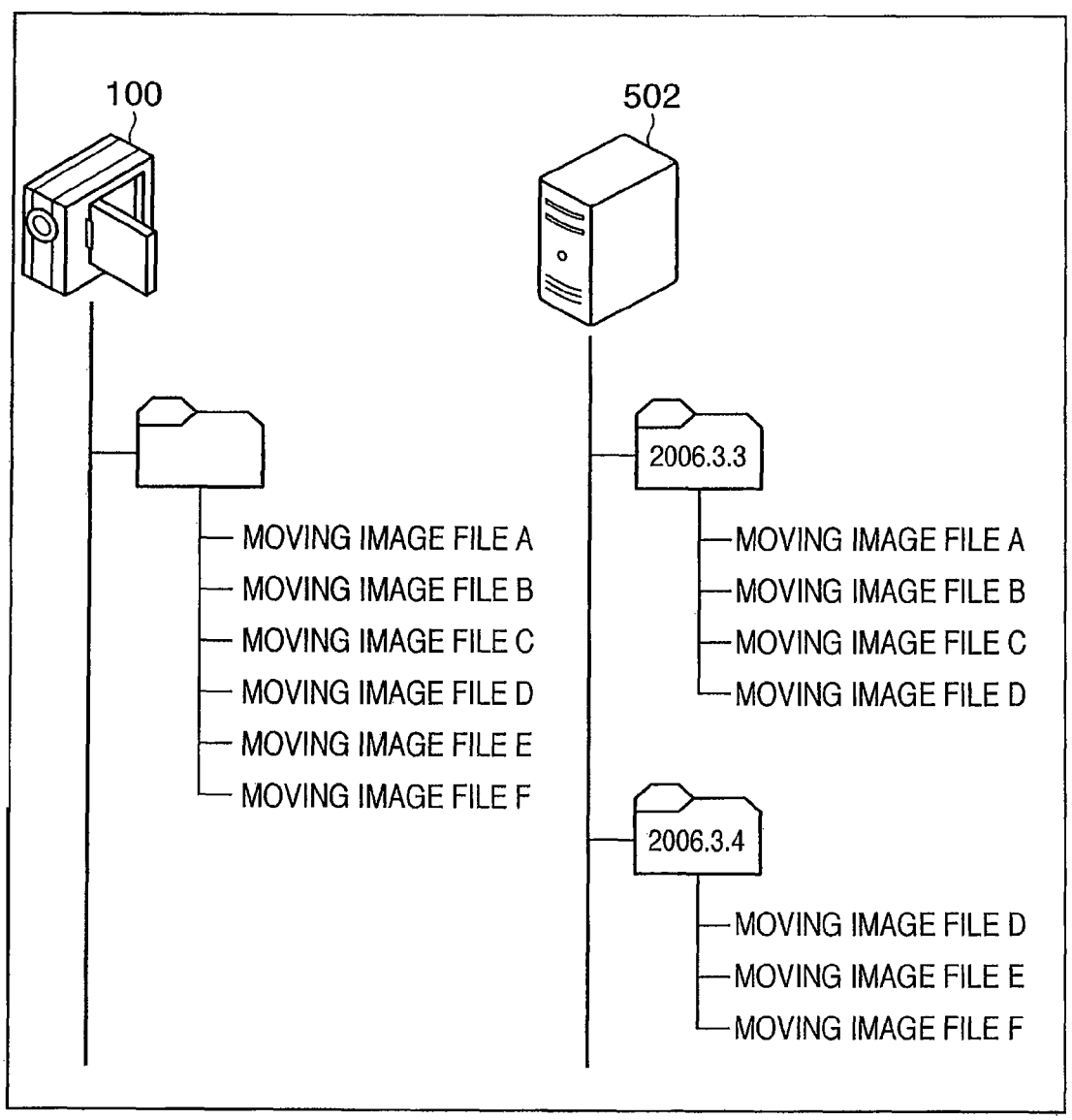
FIG. 7 is diagram showing schematically the copying process carried out by the digital video camera according to the second embodiment of the present invention.

In FIG. 7 shows an example of the use of the date-straddling flag when copying moving image files A through F shown in FIG. 2 from the digital video camera 100 to a PC 502 as one example of an external apparatus.

Figure 6:
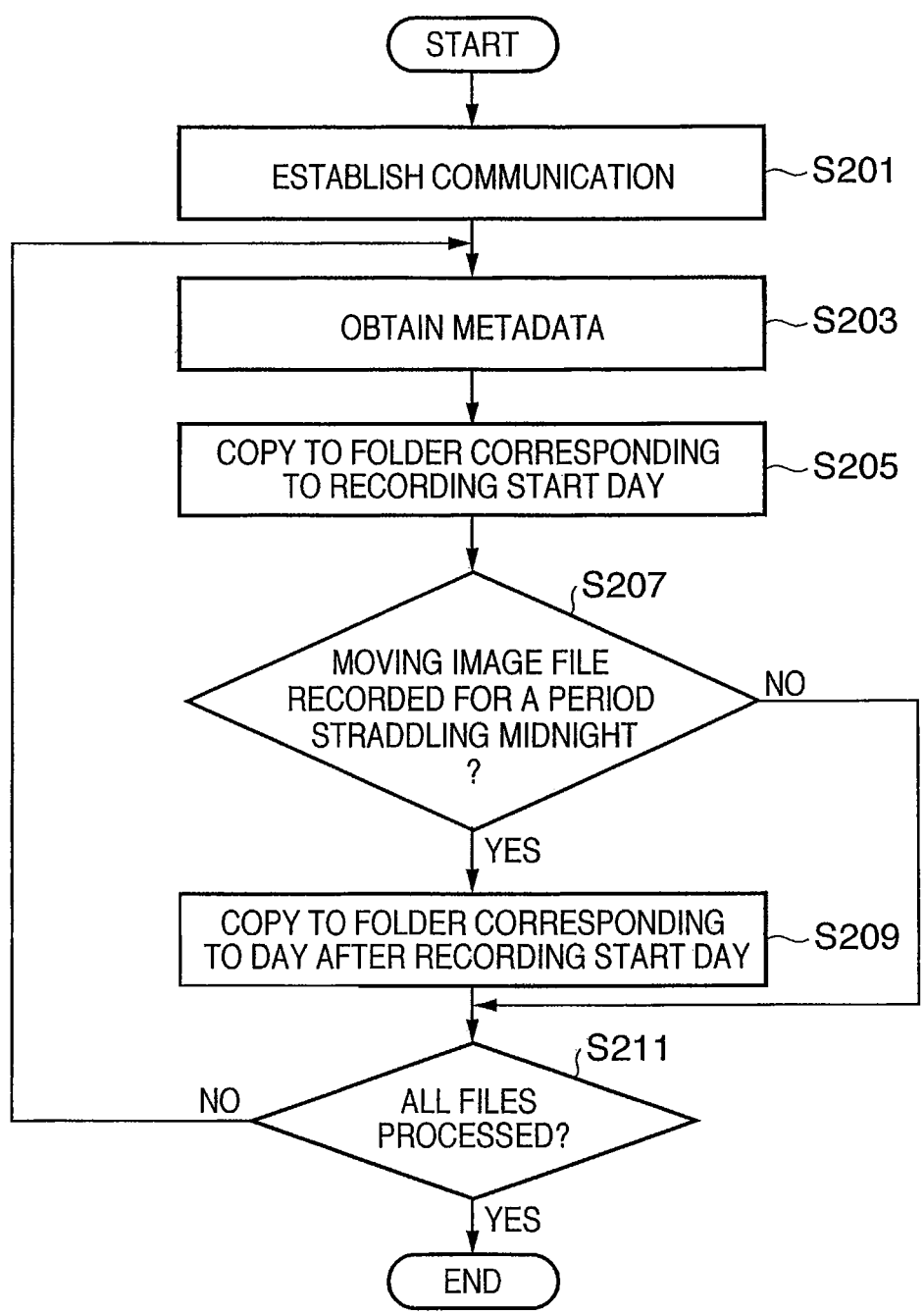
FIG. 6 is a flow chart illustrating a copying process carried out by a digital video camera according to a second embodiment of the present invention.

This file copying operation is described using the flowchart shown in FIG. 6.

The system control unit 104, when the digital video camera 100 connected to the PC 502 by a USB/I for example, carries out an initialization process in accordance with a protocol and established communication (S201). Then, when an instruction to copy is input through, for example, the operating unit 103, the system control unit 104 obtains the moving image file metadata from the hard disk drive 106 (S203).

Then, from the recording start time information included in the metadata, the system control unit 104 identifies the recording start day and copies the moving image file corresponding to that metadata to the folder corresponding to the recording start day in the storage device of the PC 502 (S205). At this time, if there is no folder corresponding to the recording start day in the PC 502, a new folder may be created.

Next, the system control unit 104 determines whether or not the copied moving image file is a moving image file recorded for a period straddling midnight (S207). This determination may be made using the date-straddling flag, and of course this determination may also be made from the recording start time information and the recording end time information, or from the recording start time information and the recording period.

If it is determined that the moving image file is recorded for a period straddling midnight, the system control unit 104 also further copies that moving image file to a folder corresponding to the day after the recording start day (S209). In S211, the system control unit 104 determines whether or not copying of all the moving image files recorded on the hard disk drive 106 is finished. If it is determined that all the moving image files have been copied, the process is ended. If it is determined that unprocessed moving image files remain, the process returns to S203 and is repeated.

As shown in FIG. 7, at the PC 502 the moving image files are automatically categorized and copied into folders corresponding to the recording start day. Further, moving image file D, which is a moving image file recorded for a period straddling midnight, is copied to the Mar. 3, 2006 folder and to the next day Mar. 4, 2006 folder.

Thus, as described above, the present embodiment associates a moving image file recorded for a period straddling midnight with both the recording start day and the day after the recording start day when copying moving image files to an external apparatus. As a result, correct search results can be obtained without the user having to remember whether or not a particular moving image file is a moving image file recorded for a period straddling midnight.

It should be noted that, in the copying process of step S209, it is possible to register information (such as a short cut, an alias, a symbolic link or the like) that references a previously copied moving image file without copying the actual moving image file. Doing so enables large savings in external apparatus storage device capacity usage.

(Other Embodiments)

In the embodiments described above, information such as the recording start time information, the recording end time information, the recording period, the date-straddling flag are recorded on the hard disk drive 106 only with the moving image file metadata. However, as moving image file management information, at least a portion of the information included in the metadata may be associated with information that identifies the moving image file and recorded separately. In that case, those processed described above that reference the metadata can be carried out with reference to the management information.

The embodiments described above can also be implemented as software by a system or an apparatus computer (or CPU, MPU or the like).

Therefore, a computer program supplied to a computer in order to implement the embodiment described above by such computer itself also implements the present invention. That is, a computer program for implementing the function of the embodiment described above is itself within the scope of the present invention.

It should be noted that a computer program for implementing the embodiments described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

Besides cases where the aforementioned functions according to the embodiments are implemented by executing the read program by computer, an operating system or the like running on the computer may perform all or a part of the actual processing, so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiment can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-188693, filed on Jul. 7, 2006, which is hereby incorporated by reference herein in its entirety.

The invention claimed is:

1. An information processing apparatus comprising:
a reproduction unit that reproduces information of a moving image file from a recording medium;
a designation unit that designates a date; and
a processing unit that selects a plurality of moving image files based on the date designated by the designation unit;
wherein in a case of a moving image file that was recorded for a period straddling midnight, the processing unit selects said moving image file that was recorded for a period straddling midnight as one of the plurality of moving image files in both cases where the date designated by the designation unit is a recording start date of said moving image file that was recorded for a period straddling midnight and where the date designated by the designation unit is a recording end date of said moving image file,
wherein the processing unit further displays on a display unit the information of the selected plurality of moving image files;
wherein, as to said moving image file that was recorded for a period straddling midnight, selected by the processing unit, the processing unit displays the information of said moving image file on the display unit in both cases where the date designated by the designation unit is the recording start date of said moving image file and the date designated by the designation unit is the recording end date of said moving image file.

2. The information processing apparatus according to claim 1, wherein the processing unit displays a thumbnail image of said moving image file as the information of said moving image file.

3. The information processing apparatus according to claim 1, wherein the processing unit displays the information of the selected moving image files that were recorded for a period straddling midnight in visually distinguishable ways depending on whether the recording start date or the recording end date of a moving image file that was recorded for a period straddling midnight corresponds to the date designated.

4. The information processing apparatus according to claim 1, wherein the processing unit displays the information of a moving image file that was recorded for a period straddling midnight and of which recording start date is different from the date designated by the designation unit in a visually distinguishable way.

5. The information processing apparatus according to claim 1, wherein the processing unit determines a recording end date of a moving image file based on information relating to a recording date of said moving image file, wherein the information is stored in the recording medium in association with said moving image file.

6. The information processing apparatus according to claim 5, wherein the information relating to the recording date of said moving image file is information indicating that the associated moving image file was recorded for a period straddling midnight.

7. The information processing apparatus according to claim 5, wherein the information relating to the recording date of said moving image file is record start time information and one of record end time information and recording period information.

8. An information processing apparatus, comprising:
a reproduction unit that reproduces information of a moving image file from a recording medium; and
a processing unit that copies moving image files to another apparatus by categorizing the moving image files by recording date;
wherein, as to a moving image file that was recorded for a period straddling midnight and having a recording start date corresponding to a first recording date and a recording end date corresponding to a second recording date, the processing unit copies said moving image file that was recorded for a period straddling midnight by categorizing said moving image file that was recorded for a period straddling midnight into both a first category corresponding to the first recording date and a second category corresponding to the second recording date.

9. The information processing apparatus according to claim 8, wherein the processing unit determines the recording start date and the recording end date of a moving image file based on information relating to a recording date of said moving image file, the information is stored in the recording medium in association with said moving image file.

10. The information processing apparatus according to claim 9, wherein the information relating to the recording date of said moving image file is information indicating the associated moving image file was recorded for a period straddling midnight.

11. The information processing apparatus according to claim 9, wherein the information relating to the recording date of said moving image file is record start time information and one of record end time information and recording period information.

12. An information processing method performed by an information apparatus comprising the steps of:
reproducing information of a moving image file from a recording medium;
designating a date; and
selecting a plurality of moving image files based on the designated date, wherein in a case of a moving image file that was recorded for a period straddling midnight, said moving image file that was recorded for a period straddling midnight is selected as one of the plurality of moving image files in both cases where the date designated by the designation unit is a recording start date of said moving image file that was recorded for a period straddling midnight and where the date designated by the designation unit is a recording end date of said moving image file;
displaying the information of the selected plurality of moving image files on a display unit;
wherein, in the step of displaying, as to said moving image file that was recorded for a period straddling midnight, selected in the selecting step, the information of said moving image file on the display unit is displayed in both cases where the designated date is the recording start date and the recording end date of said moving image file.

13. An information processing method performed by an information apparatus, comprising the steps of:
reproducing information of a moving image file from a recording medium; and
copying moving image files to another apparatus by categorizing the moving image files by recording date;
wherein, in the step of copying, as to a moving image file that was recorded for a period straddling midnight and having a recording start date corresponding to a first recording date and a recording end date corresponding to a second recording date, said moving image file that was recorded for a period straddling midnight is copied by categorizing said moving image file that was recorded for a period straddling midnight into both a first category corresponding to the first recording date and a second category corresponding to a second recording date.

14. An information processing apparatus comprising:
reproduction means for reproducing information of a moving image file from a recording medium;
designation means for designating a date; and
processing means for selecting a plurality of moving image files based on the date designated by the designation means;
wherein in a case of a moving image file that was recorded for a period straddling midnight, the processing means selects said moving image file that was recorded for a period straddling midnight as one of the plurality of moving image files in both cases where the date designated by the designation means is a recording start date of said moving image file that was recorded for a period straddling midnight and where the date designated by the designation unit is a recording end date of said moving image file,
wherein the processing means further displays on a display unit the information of selected plurality of moving image files;
wherein, as to said moving image file that was recorded for a period straddling midnight, selected by the processing means, the processing means displays the information of said moving image file on the display unit in both cases where the date designated by the designation unit is the recording start date of said moving image file and the date designated by the designation unit is the recording end date of said moving image file.

15. The information processing apparatus according to claim 14, wherein the processing means displays the information of the selected plurality of moving image files that were recorded for a period straddling midnight in visually distinguishable ways depending on whether the recording start date or the recording end date of a moving image file that was recorded for a period straddling midnight corresponds to the date designated.

16. The information processing apparatus according to claim 14, wherein the processing means displays the information of a moving image file that was recorded for a period straddling midnight and of which recording start date is different from the date designated by the designation unit in a visually distinguishable way.

17. An information processing apparatus, comprising:
reproduction means for reproducing information of a moving image file from a recording medium; and
processing means for copying moving image files to another apparatus by categorizing the moving image files by recording date;
wherein, as to a moving image file that was recorded for a period straddling midnight and having a recording start date corresponding to a first recording date and a recording end date corresponding to a second recording date, the processing means copies said moving image file that was recorded for a period straddling midnight by categorizing said moving image file that was recorded for a period straddling midnight into both a first category corresponding to the first recording date and a second category corresponding to the second recording date.

* * * * *